United States Patent [19]

Baldwin et al.

[11] 4,212,118
[45] Jul. 15, 1980

[54] SYSTEM OF INTERACTIVE BLOCKS

[75] Inventors: Blair F. Baldwin; Deborah Stoddard, both of New York, N.Y.

[73] Assignee: Baldwin, Stoddard & Company, New York, N.Y.

[21] Appl. No.: 50,457

[22] Filed: Jun. 20, 1979

Related U.S. Application Data

[63] Continuation-in-part of Ser. No. 11,072, Feb. 12, 1979.

[51] Int. Cl.$^2$ .............................................. G09B 19/02
[52] U.S. Cl. ....................................... 35/31 C; 35/9 R
[58] Field of Search ......................... 35/9 R, 31 C, 70

[56] References Cited

U.S. PATENT DOCUMENTS

| | | | |
|---|---|---|---|
| 1,974,901 | 9/1934 | Stadler | 35/9 R X |
| 3,504,449 | 4/1970 | Kobler | 35/31 C X |
| 3,571,950 | 3/1971 | Walker | 35/31 C |
| 3,696,533 | 10/1972 | Mortensen | 35/70 |

*Primary Examiner*—Harland S. Skogquist
*Attorney, Agent, or Firm*—Burgess, Ryan and Wayne

[57] ABSTRACT

A system of children's blocks for teaching arithmetic, comprising various types of arithmetic operation blocks, and a number of answer blocks. Each block has a rod dimensioned in accordance with a predetermined numerical value. Addition blocks contain a linearly slidable rod having a portion protruding from the block a distance corresponding to a numerical value printed on the block. When two or more addition blocks are aligned, the rods of said blocks push against each other, to cause the rod of one of the end blocks to protrude a distance corresponding to the sum of the values of the mutually engaged blocks. An answer block contains a "Yes" light and/or an audible bell chime coupled to electrical sensing switches which are positioned so that an indication of correct result is displayed only when the protruding portion of the rod of an engaged addition block corresponds to a value associated with the answer block utilized. Thus the child can successfully engage addition blocks with an answer block only when the value of the answer block corresponds to the sum of the values of the addition blocks. Subtraction is taught by the use of negative value addition blocks. Multiplication and division blocks are of the same form as addition and subtraction blocks respectively, but have dimensions logarithmically proportional to the corresponding numerical values. The same answer blocks are used for all four arithmetic processes, and may also be employed for chain calculations.

20 Claims, 21 Drawing Figures

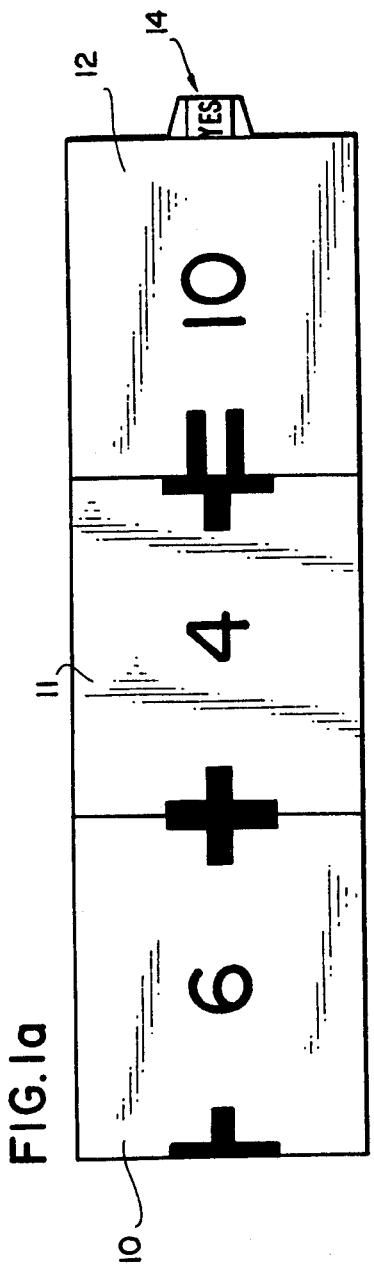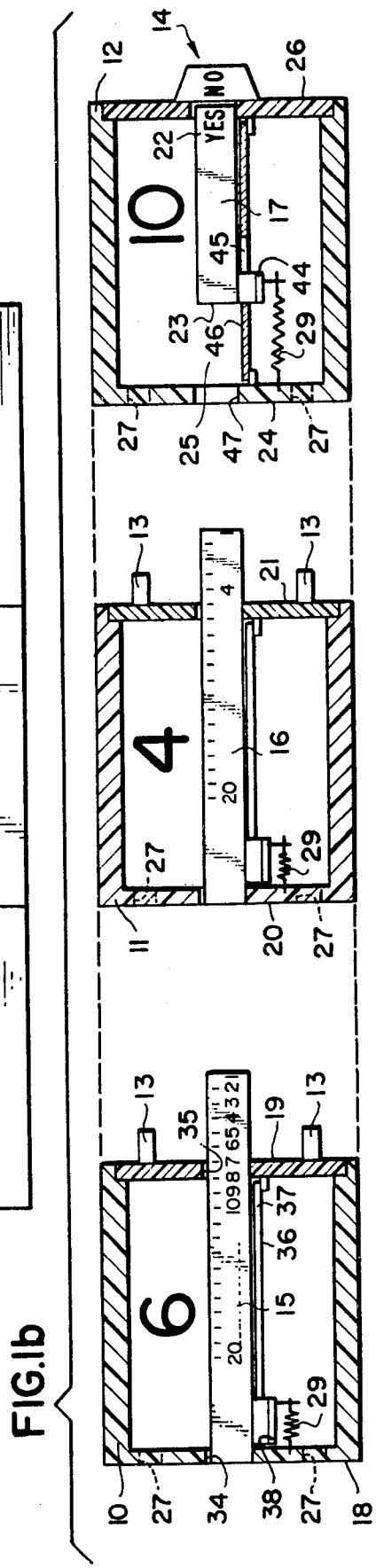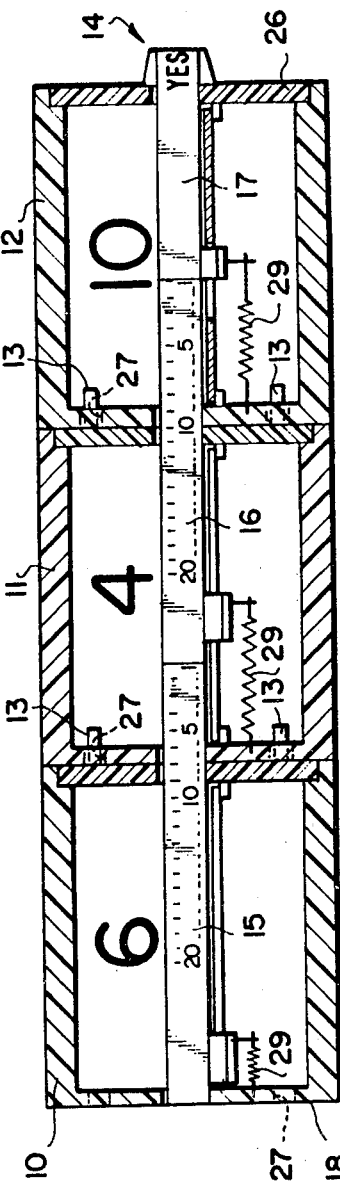

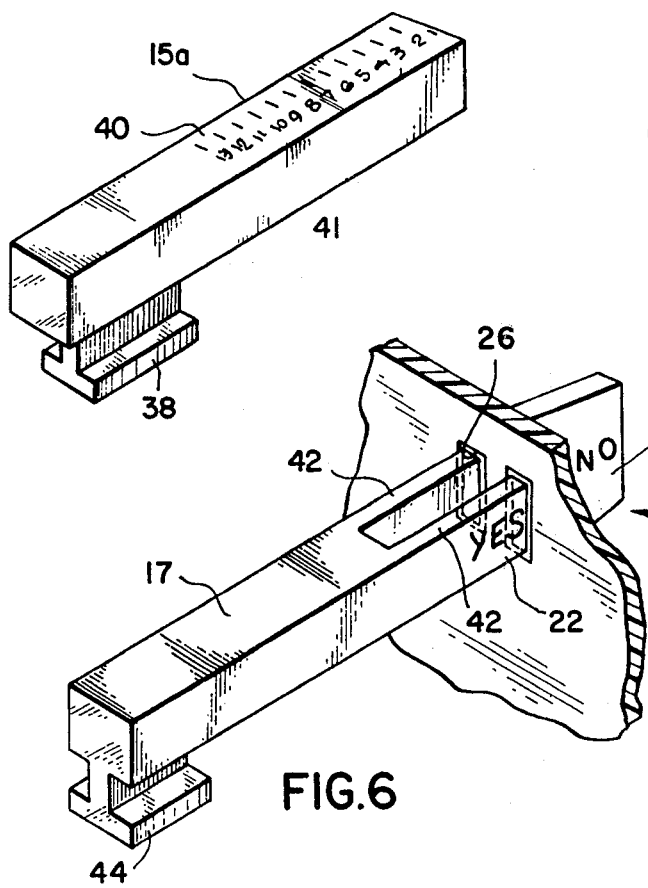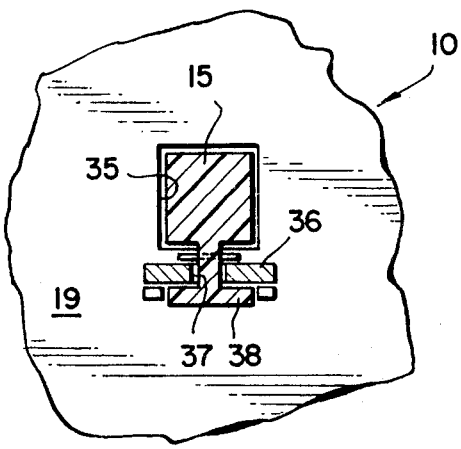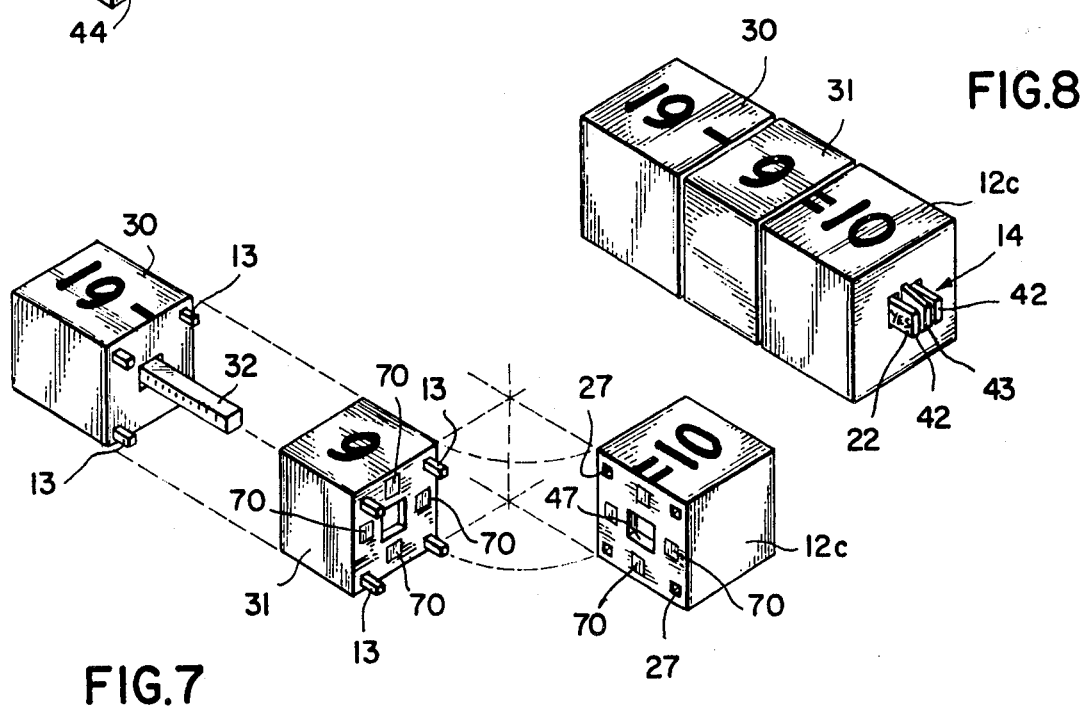

SYSTEM OF INTERACTIVE BLOCKS

This application is a continuation-in-part of U.S. Ser. No. 11,072, filed Feb. 12, 1979, now pending.

This application relates to a system of interactive blocks for teaching arithmetic.

Numerous educational toys and schemes are known in the art for teaching arithmetic. Among these are various games and tutorial types of electronic calculators. However, there is need for a relatively simple system in the nature of a toy which can be utilized for teaching arithmetic to pre-school children. A preferable type of toy for this purpose is one in the form of various blocks, since pre-school children are generally accustomed to playing with blocks, and the blocks are safe and do not require a high degree of mechanical coordination skill for assembly.

Accordingly, an object of the present invention is to provides a system of such blocks which can be assembled in accordance with the rules of arithmetic.

As herein described, there is provided a system of interactive blocks for teaching arithmetic, comprising: a plurality of addend blocks eaching having: first and second spaced parallel exterior surfaces and a hole extending through said block between said surfaces; an elongated rod mounted within said hole for linear movement in a direction transverse to said surfaces; means for limiting the movement of said rod so that when one end of said rod is adjacent said first surface the other end thereof is separated from said second surface by a predetermined distance linearly proportional to a first positive or negative numerical value, and so that said one end of said rod is movable only between said surfaces; a plurality of answer blocks each having: a pair of spaced exterior surfaces and an elongated recess communicating with a selected one of said surfaces; and means for indicating when said rod extends into said recess a distance within a predetermined range of distance values corresponding to a given numerical value.

Also herein described is a system of interactive blocks for teaching arithmetic, comprising a plurality of minuend blocks each having an elongated rod extending from a given surface thereof, a first predetermined distance linearly proportional to a first numerical value; a plurality of subtrahend blocks each having parallel first and second spaced exterior surfaces and a hole extending through said subtrahend block between said surfaces, the width of said subtrahend block between said surfaces being linearly proportional to a second numerical value; a plurality of answer blocks each having: a pair of spaced exterior surfaces and an elongated recess communicating with a selected one of said pair of surfaces; and means for indicating when said rod extends into said recess a distance within a predetermined range of distance values corresponding to a given numerical value.

Also according to the invention, systems similar to those described above may be utilized for multiplication and division by employing arithmetically-related dimensions which are logarithmically proportional (rather than linearly proportional) to desired numerical values.

IN THE DRAWING

FIGS. 1a to 1e are schematic illustrations showing the manner in which blocks according to the invention are utilized in the teaching of addition;

FIGS. 5a and 5b are perspective and end views respectively of the rod utilized in the addend or multiplicand blocks according to the invention;

FIG. 6 is a perspective view of the flag member and indicating means utilized in an answer block having a mechanical sensing arrangement according to the invention;

FIG. 7 is a partially cut-away perspective view showing adjacent minuend, subtrahend and answer blocks according to the system of the invention;

FIG. 8 is a partially cut-away perspective view showing the blocks of FIG. 7 in mutually engaged relationship;

Figure 1D:
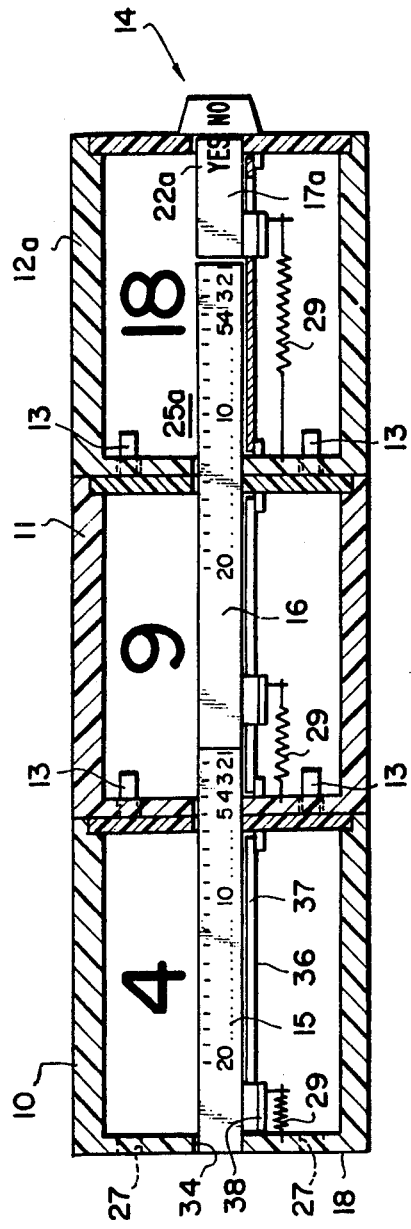

As illustrated in FIGS. 1a–1e, addition is taught by means of at least two (positive value) addend blocks 10 and 11, and an answer block 12 selected by the child from one of a plurality of such blocks. Each block has a numerical value associated therewith, which may be designated in Roman, Arabic, or another notation. The left and right sides of each addend block are imprinted with a "plus" (for positive value blocks) or a "minus" (for negative value blocks) symbol. The answer block has an "equals" symbol imprinted at the left side thereof. Preferably, such symbols and numerical values are imprinted on the four surfaces of each block extending between the left and right surfaces thereof as seen in FIG. 1a; alternatively, complete sign symbol may be provided on each block.

Each of the blocks 10, 11 and 12 may have indexing means for maintaining adjacent surfaces of the blocks in mutual alignment. For example, the right side of each addend block has two or more alignment pegs 13 extending therefrom, with corresponding alignment holes in the left surfaces of the addend and answer blocks.

The answer block 12 has a display means 14 extending therefrom, said means displaying either a "yes" or "no" value depending upon the relationship between the arithmetic values associated with the blocks 10, 11 and 12.

As better illustrated in FIGS. 1b to 13, the blocks 10, 11 and 12 can be placed together by a child with a resulting "yes" display by the means 14 and the blocks with mutually engaged surfaces, only when the imprinted information displayed on the set of blocks so formed corresponds to an arithmetically correct statement.

This relationship among the blocks is provided by means of metering rods 15 and 16 mounted for linear transverse sliding movement between the left and right surfaces of the addend blocks 10 and 11 respectively, and a transversely movable sliding flag member 17 mounted within the answer block 12 for movement in a direction transverse to the left and right surfaces thereof, as shown in FIG. 1b.

Figure 10:
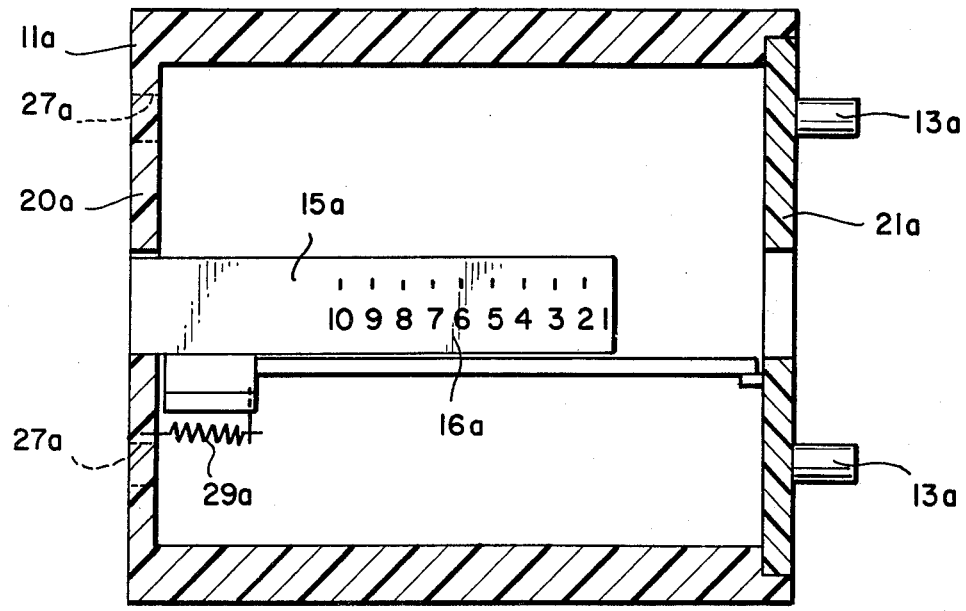
FIG. 10 is a cross-sectional view of an addend block having a rod of length corresponding to a negative numerical value.

Means within each of the addend blocks 10 and 11 limits the range of sliding movement of the corresponding rod, so that when the left end of the rod is adjacent the left surface of the block, the right end of the rod (i) protrudes beyond the right surface of the block by a distance which is linearly proportional to the corresponding positive numerical value, or (ii) is disposed to the left of said right surface a distance which is linearly proportional to the corresponding negative value, as best seen in the block 11a of FIG. 10. For example, the right end of the rod 15 (when the left end of the rod is adjacent the left surface 18 of the block 10) protrudes beyond the right surface 19 of the block 10 by a distance corresponding to the value "4"; while the right end of the rod 16 (when the left end of said rod is adjacent the left side 20 of the block 11) protrudes beyond the right surface 21 of the block 11 by a distance corresponding to the numerical value "9," i.e., 2¼ times the distance of protrusion of the rod 15.

The range of sliding movement of the flag member 17 of the answer block 12 is limited to a distance roughly corresponding to the width of the "yes" symbol 22 imprinted thereon, said range of movement being approximately equal to a distance corresponding to one arithmetic unit; alternatively, mechanical advantage providing means may be employed to increase the range of movement of the flag member 17. The left end 23 of the flag member 17 has a left-most position which is disposed a distance from the left side 24 of the answer block 12, corresponding to a numerical value of approximately 12, so that upon insertion of a rod into the cavity 25 of the block 12 having a length corresponding to 13 units, the flag member 17 is pushed to the right so that the "yes" symbol 22 is displayed outside the right surface 26 of the answer block 12.

Thus, when the addend blocks 10 and 11 are moved into mutually engaged relationship, i.e. with the surfaces 19 and 20 in mutual contact and the rods 13 aligned with the holes 27, the rod 15 of the block 10 pushes the rod 16 of the block 11 four units to the right, so that the rod 16 now protrudes thirteen units beyond the right surface 21 thereof, as most clearly shown in FIG. 1c. When the assemblage of the blocks 10 and 11 is placed together with the answer block 12, i.e. with the surfaces 21 and 24 in mutual contact, the protruding end of the rod 16 extends into the cavity 25 of the answer block 12, so that the flag member 17 is pushed to the right, causing the "yes" symbol 22 thereof to extend from the right surface 26 of the block 12 to display a "yes" visible verification of the correct engagement of the blocks 10, 11 and 12.

If a child selects an answer block 12a corresponding to a higher numerical value than the sum of the values represented by the blocks 10 and 11, the protrusion of the rods 16 of the block 11 into the cavity 25a of the answer block 12a (which in FIG. 1d corresponds to a numerical value of 18) will be insufficient to reach the left end of the flag member 17a, so that the flag member will not be moved and the "yes" symbol 22a thereon will not be made visible outside the answer block 12a, thus indicating to the child that the arithmetic statement made by the blocks 10, 11 and 12a is incorrect.

Figure 1E:
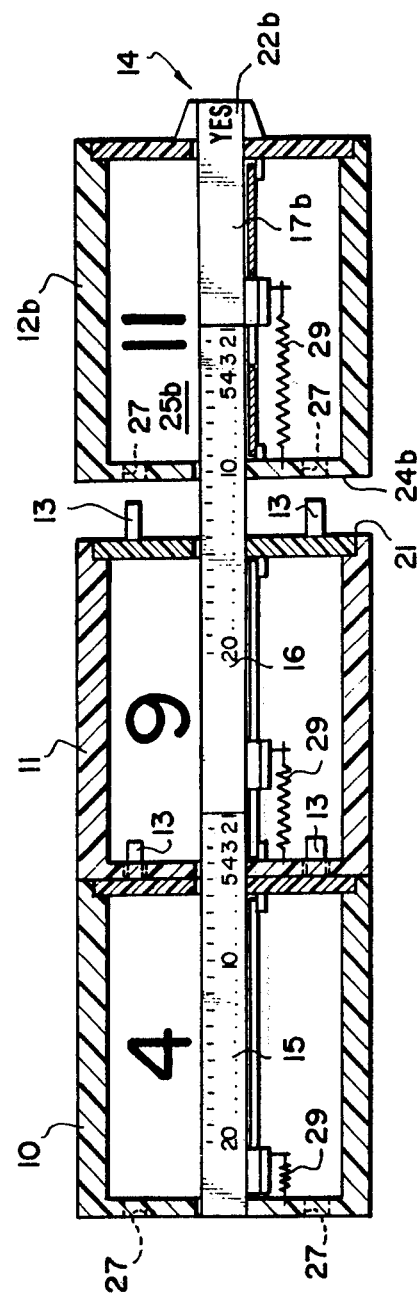

When an answer block 12b is selected which has a numerical value less than the value associated with the sum of the values of the blocks 10 and 11, as illustrated in FIG. 1e, the length of the protruding portion of the rod 16 of the block 11 is greater than the depth of the recess 25b of the answer block 12b, so that although the flag member 17b is pushed to the right (displaying the "yes" symbol 22b), it is impossible to bring the blocks 11 and 12b together so that the adjacent surfaces 21 and 24b thereof are in mutual contact. Thus the child learns that the corresponding arithmetic statement is incorrect, because he cannot bring all three blocks into mutual engagement.

As schematically illustrated in FIG. 1b, springs 29 may be provided within each of the blocks to urge the corresponding rod or flag members toward the left sides of said blocks.

Figure 9:
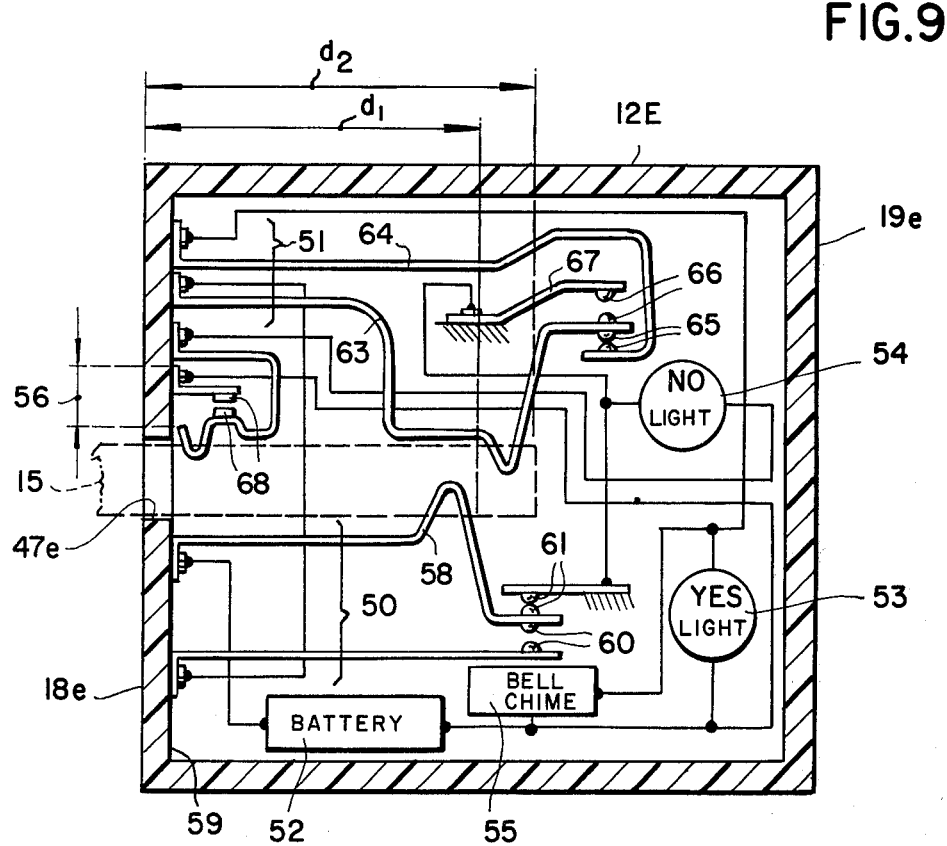
FIG. 9 is a functional schematic diagram of an answer block having an electrical sensing arrangement according to the invention.

Another form of answer block 12E, which operates in the same manner as the blocks 12, 12a and 12b, is shown in FIG. 9.

The electrically operated answer block 12E has a recess 47e in the left side 18e thereof, for receiving an addend block rod 15. The righ side 19e of the block 12E has no hole therein. Disposed within the answer block 12E are sensing switches 50 and 51. The sensing switch 50 is actuated by the entry of a rod 15 a distance $d_1$ or greater into the answer block through the recess 47e. The switch 51 is actuated by entry of the rod 15 a distance into the answer block 12E equal to or greater than the distance $d_2$. The difference between the dimensions $d_2$ and $d_1$ is less than the length of a portion of the rod 15 corresponding to one arithmetic unit. The answer block 12E is designed to indicate when the length of the rod 15 extending thereis between $d_1$ and $d_2$, i.e. as a numerical value corresponding to that associated with the particular answer block 12E involved.

Thus, for rods 15 having a length less than the desired value, neither of the switches 50 and 51 is actuated; for rods 15 having a length greater than the desired value, both of the switches 50 and 51 are actuated; and for rods 15 having a length equal to the desired value, the switch 50 is actuated while the switch 51 is not actuated.

The answer block 12E contains a battery 52, satisfactory result of "Yes" indicator light 53, unsatisfactory result of "No" indicator light 54, and a bell chime 55 which provides an audible indication of satisfactory result. If desired, a buzzer may be provided in parallel with the light 54 to provide an audible indication of unsatisfactory result.

As shown in FIG. 9, the lights 53 and 54 and bell chime 55 are wired so as to produce the aforementioned indications. That is, the satisfactory result light 53 and chime 55 are energized whenever the switch 50 is actuated and switch 51 is not actuated; and the unsatisfactory result light 54 is actuated whenever a rod 15 is inserted in the recess 47e and the aforementioned condition is not present. The unsatisfactory result light 54 is rendered operative, i.e. capable of lighting up under the aforementioned condition, whenever a rod 15 is inserted in the recess 47e, by means of a rod sensing switch 56.

Each of the switches 50, 51 and 56 has a ramp portion extending into the hole which is aligned with the recess 47e, so that said ramp portion is engageable by the rod 15 to actuate the corresponding switch.

The switch 50 has resilient conductive leaves 57 and 58 secured at their left ends to the inner wall 59 of the answer block 12E. The other ends of said leads terminate in a normally open set of contacts 60, with a normally closed set of contacts 61 being provided by cooperation of the leaf 58 with a fixed leaf 62.

Similarly, the switch 51 comprises resilient conductive leaves 63 and 64 secured at their left ends to the wall 59, with their right ends forming a normally closed set of contacts 65, and the leaf 63 forming a normally open set of contacts 66 with the fixed leaf 67.

The switch 56 has a normally open set of contacts 68, connected in series between the battery 52 and the "No" light 54.

Figure 2A:
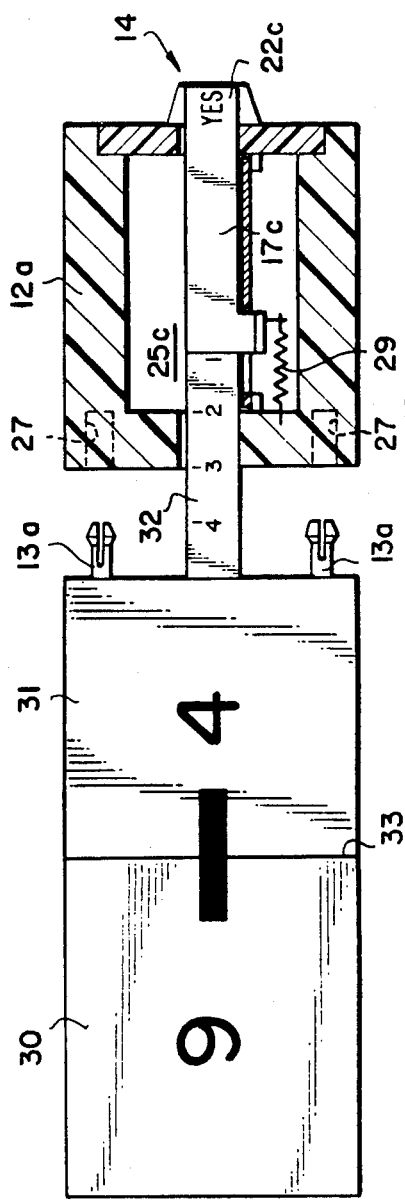
FIGS. 2a to 2c are schematic illustrations showing the manner in which blocks according to the invention are utilized in the teaching of subtraction.
Figure 2B:
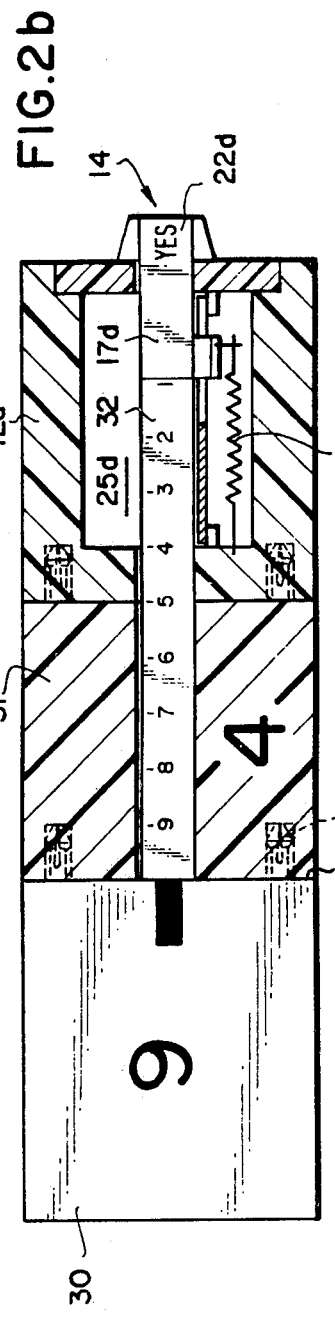
Figure 2C:
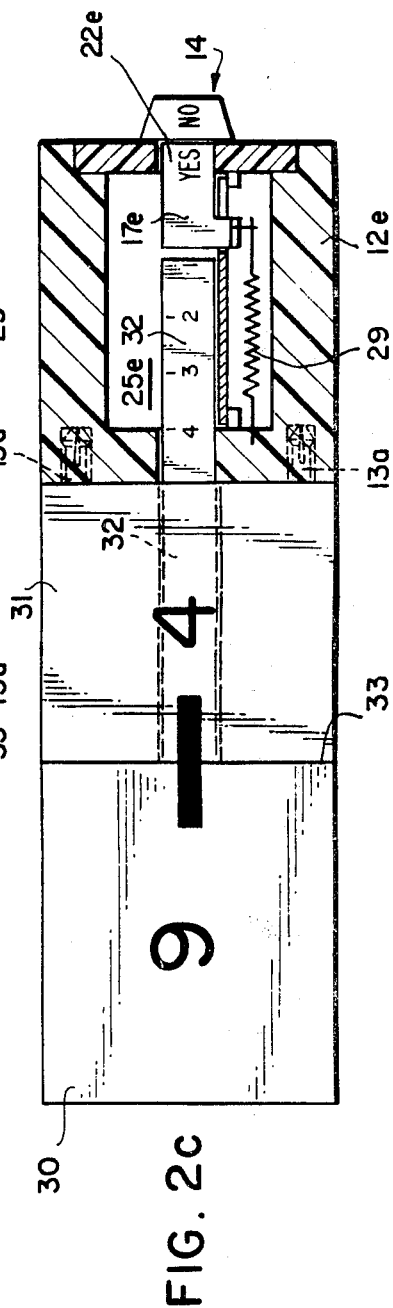

A system of blocks for teaching subtraction is provided in a similar fashion, as illustrated in FIGS. 2a-2c. The blocks can be arranged to form arithmetic subtraction statements by utilization of a minuend block 30, one or more subtrahend blocks 31, and an answer block 12c. The answer blocks utilized in the teaching of subtraction are of the same construction as those utilized in the teaching of addition.

The minuend block 30 corresponding to a desired numerical value ("9" in FIGS. 2a-2c) has a non-movable rod 32 affixed thereto, and extending a distance linearly proportional to the corresponding numerical value from the right side 33 thereof. The pegs 13a protruding from the surface 33 have resiliently deformable ends of resilient material or spring metal, so that a detent action is provided with respect to the corresponding holes 27 of the subtrahend block 31, to maintain the blocks 30 and 31 in mutually engaged relationship. The subtrahend block 31 has parallel left and right surfaces with a hole extending therebetween to permit the rod 32 of the minuend block 30 to pass therethrough. In effect, the subtrahend block 31 reduces the effective length of the protrusion of the rod 32 by an amount corresponding to the distance between the parallel left and right surfaces of said subtrahend block, which distance which is linearly proportional to a desired numerical value ("4" in FIGS. 2a-2c).

As in the case of the addend blocks 10 and 11, numerical and subtraction symbols are imprinted on the surfaces of the minuend and subtrahend blocks 30 and 31 respectively, said imprinted values corresponding to the related dimensions of the rod 32 and distance between left and right surfaces of the block 31 respectively.

When an answer block 12d (FIG. 2b) is engaged with the minuend and subtrahend blocks 30 and 31, having an associated numerical value corresponding to the difference between the numerical values associated with said minuend and said subtrahend blocks, the length of the effective protrusion of the rod 32 into the cavity 25d of the answer block 12d is sufficient to push the flag member 17d to the right so that the "yes" symbol 22d is displayed, while also permitting the left surface of the answer block 12d to engage the right surface of the subtrahend block 31, thus indicating to the child that he has made a correct arithmetic subtraction statement.

Incorrect assembly of minuend, subtrahend and answer blocks is indicated to the child in the manner similar to that previously described with reference to FIGS. 1a-1e. That is, the attempt to engage an answer block having a lower numerical value than the correct value, as illustrated in FIG. 2a, results in pushing the flag member 17c to the right and displaying the "yes" symbol 22c, but rendering engagement of the left surface of the answering block 12c with the right surface of the subtrahend block 31 impossible.

Similarly, as illustrated in FIG. 2c, the selection of an answering block 12e having a numerical value higher than the difference between the values associated with the blocks 30 and 31 results in a depth of the cavity 25e which is greater than the effective protruding length of the rod 32, so that the rod 32 does not contact the flag member 17e, and the "yes" symbol 22e is not displayed outside the answer block 12e.

Alternatively, subtraction may be accomplished by the use of negative addend blocks such as the block 11a shown in FIG. 10. In effect, subtraction is in this case accomplished by adding negative numbers rather than subtracting positive numbers, these techniques being of course mathematically identical. With this arrangement, chain calculations involving various combinations of addition and subtraction operations may be realized.

Figure 3A:
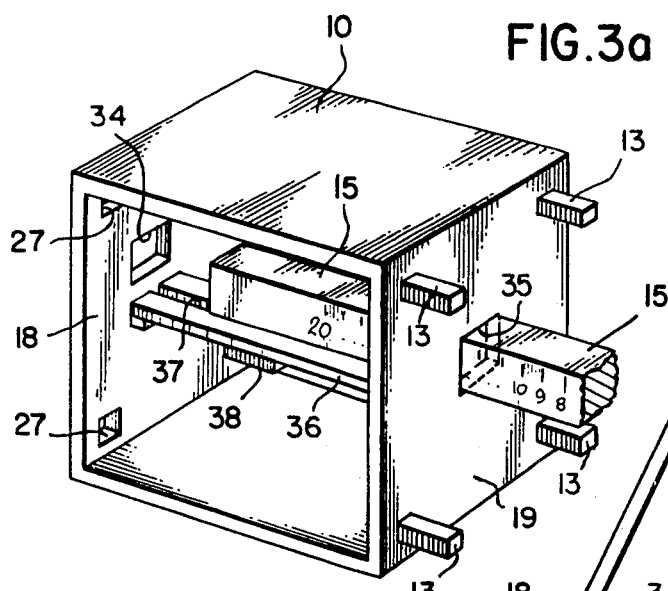
FIGS. 3a and 3b are cut-away perspective views showing the interior of an addend block utilized in the system according to the invention.
Figure 3B:
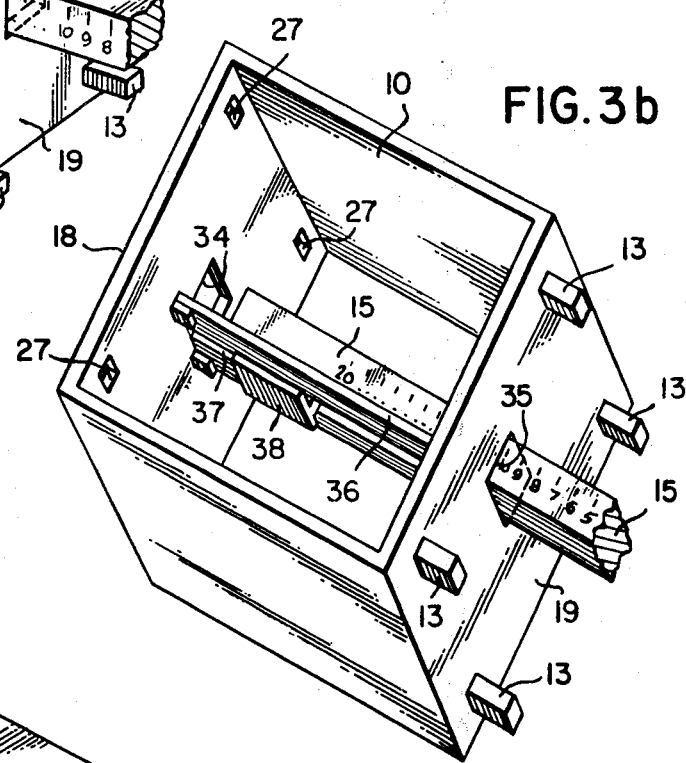

The construction of the addend block 10 is more clearly shown in FIGS. 3a and 3b, in which it is seen that the left and right surfaces 18 and 19 are each provided with aligned holes of rectangular cross section 34 and 35 respectively, defining a transverse path for movement of the rod 15 and a rod associated with another addend block therethrough.

The movement of the rod 15 is supported and guided by a flat support member 36 having a longitudinal elongated slot 37 therein. The rod 15 has a rail 38 extending from the bottom thereof and having a t-shaped cross section to engage the slot 37 of the support 36, thus providing sliding movement of the rod 15 with respect to said slot.

When the rod 15 is moved to the left, the left edge of the rail 38 abuts the left side 18 of the block, thus limiting the movement of the left end of the rod 15 so that said end is disposed adjacent the hole 34 and does not extend outside the block. When the rod 15 is at this leftmost position, the right end of said rod protrudes beyond the right side 19 of the block 10 by a distance linearly proportional to the numerical value associated with said block.

FIG. 3b shows the rod 15 at an intermediate position to which it might by moved by engagement with another addend block. The maximum amount by which the right end of the rod 15 can be made to extend from the right surface 19 thereof may have any desired value, limited only by the width of the block.

Multiplication and division operations can be taught by means of the addition and subtraction systems previously described with reference to FIGS. 1a-e and 2a-c respectively, except that arithmetically related dimensions must be made logarithmically proportional to the desired values, rather than linearly proportional thereto. That is, the lengths of the protruding portions of the rods of the addend blocks must be logarithmically proportional to the associated numerical values, and the depth of the recess 25 of the answer block 12 must also be logarithmically proportional to the numerical value represented by said block. For division operations, the length of the rod 32 of the minuend block 30 must be logarithmically proportional to the desired value, as must be the width between the left and right surfaces of the subtrahend block 31.

With such a change from linear to logarithmic proportions of the numerically related dimensions of the blocks, the system of blocks shown in FIGS. 1a-1e can be utilized for multiplication, and the system of blocks shown in FIGS. 2a to 2c can be utilized for division. In effect, the systems of blocks function as very simplified slide rules in these multiplication and division arrangements.

FIG. 5a shows an addend block rod 15a with associated rail 38, with a linear scale 40 facilitating use of the rod for addition, and a logarithmic scale 41 facilitating use of the rod for multiplication.

FIG. 5b shows a cross-sectional view of the rod 15 in engaement with the slot 37 of the support 36, within the block 10.

A more detailed illustration of the flag member 17 of the answer block 12 appears in FIG. 6, in which it is seen that the flag member 17 has a forked end with two tines 42 positioned to straddle a stationary "no" member 43 affixed to the right surface 26 of the corresponding answer block when the flag member 17 is pushed to the right by contact with a rod of an adjacent block extending into the recess of the answer block in which the flag member 17 is situated.

FIG. 7 shows the manner in which minuend, subtrahend and answer blocks 30, 31 and 12c are to be assembled to make a correct arithmetic subtraction statement, i.e. $19-9=10$, with the subtrahend and answer blocks shown with the front surfaces thereof removed. FIG. 8 shows these blocks in mutual engagement, wherein it is seen that a "yes" symbol of the answer block has been pushed beyond the right surface of the answer block to straddle the fixed "no" symbol and indicate that the blocks have been correctly assembled to make a true arithmetic subtraction statement.

If desired, magnets 70 may be provided embedded in or affixed to adjacent surfaces of the blocks 31 and 12c, as shown in FIG. 7, to detachably retain said blocks in mutual engagement.

Figure 4:
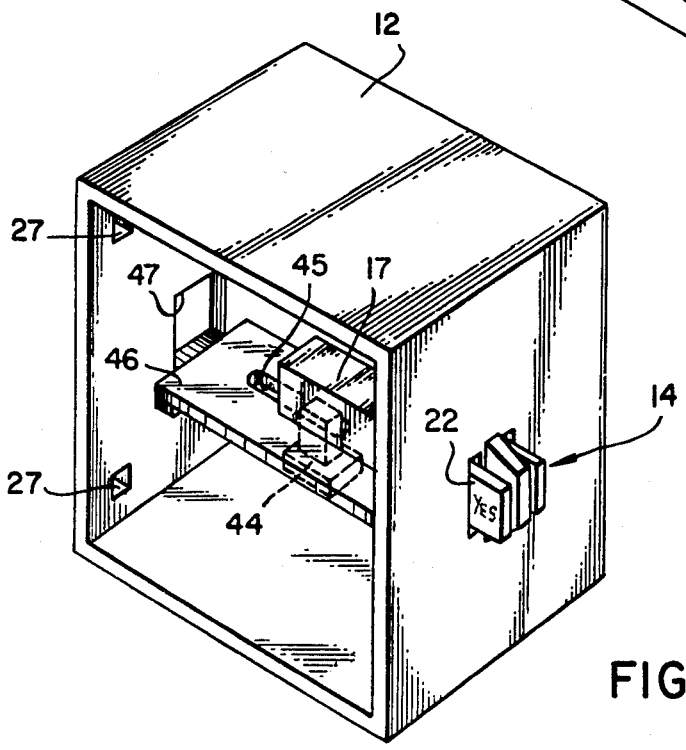
FIG. 4 is a cut-away perspective view showing the interior of an answer block utilized in the system according to the invention.

As best seen in FIG. 4, sliding movement of the flag member 17 of the answer block 12 is provided by engagement of the t-shaped rail 44 thereof with a slot 45 of the flat support 46. The length of the slot 45 is such that the range of linear movement of the flag member 17 corresponds to approximately one arithmetic unit. The hole 47 in the left side of the block permits the rod of another block to enter the answer block and engage the flag member 17.

Preferably, a large number of the various types of blocks described above is provided, so that a child to be taught arithmetic may select various combinations of blocks, and immediately learn whether he has made an arithmetically correct statement, by determining whether or not the blocks fit together with their adjacent surfaces in mutual contact and the "yes" symbol is visibly displayed at the right of the answer block.

An addend block corresponding to the value zero has a rod 15 the ends of which are initially coplanar with the left and right sides 18 and 19 of said block respectively. A zero value minuend block simply has a flat right surface 33, without any rod 32 extending therefrom. A zero value subtrahend block could be represented merely by a thin sheet having holes therein through which the rod 32 and pegs 13 of a minuend block 30 may extend. A zero value answer block would have the left end of the flag member 17 thereof initially extending one arithmetic unit outwardly from the left side 24 thereof.

Figure 11A:
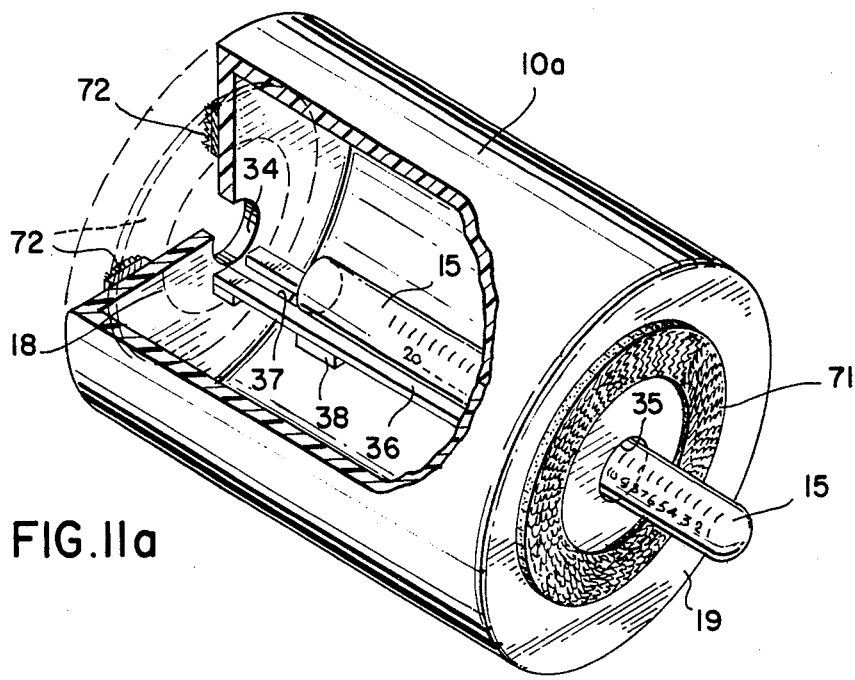
FIGS. 11a and 11b cut-away perspective views of a cylindrical addend block according to an alternative embodiment of the invention.
Figure 11B:
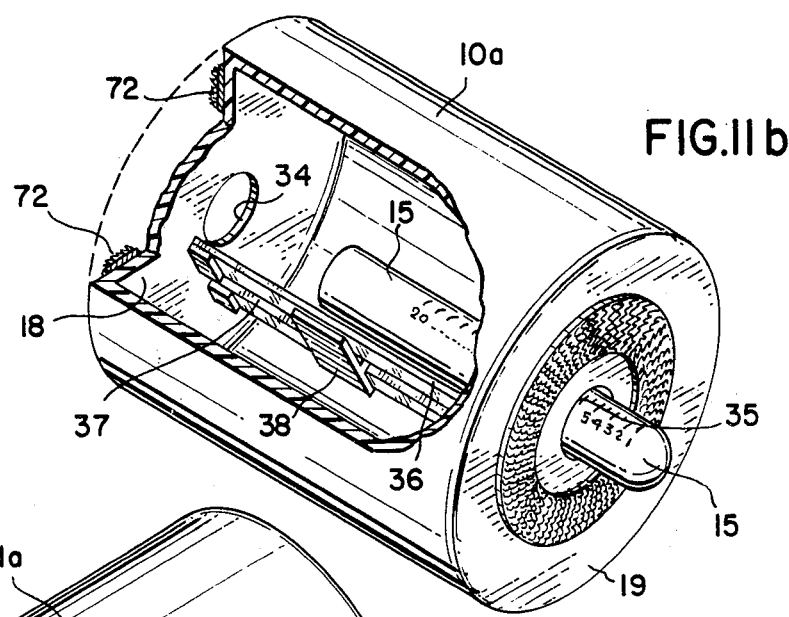
Figure 11C:
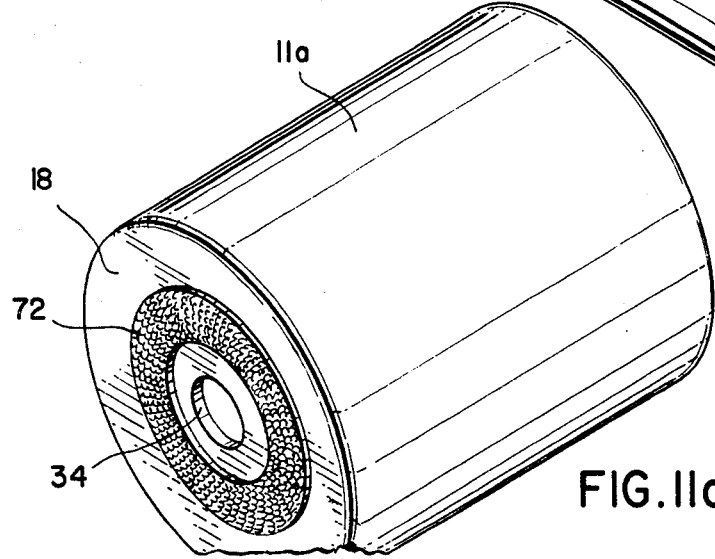

Rather than being in the form of cubes or rectangular prisms, the various blocks shown in the drawing may be of cylindrical shape, so long as the surfaces through which the rods 15 and 17 may extend are parallel to each other. Such a cylindrical block construction is shown in FIGS. 11a to 11c, wherein an addend block 10a is illustrated. Of course, any or all of the other blocks shown in the drawings could be similarly constructed.

As is also evident in FIGS. 11a–11c, the metering rod 15 is also cylindrical, and additionally has a convex right end and a concave left end, to facilitate engagement of adjacent rods with each other. Adjacent blocks are detachably secured to each other by means of hook-and-pile fastener material such as that marketed under the trademark "Velcro." The right side of each of the blocks to be so engaged is provided with an annular Velcro ring 71 of hook material, while the left side of each such block is provided with a similarly shaped annular Velcro ring 72 of pile type material. Thus adjacent cylindrical blocks may be mutually engaged without regard to the rotational angular relationship therebetween.

The various rods 15, 16, 17, etc., instead of being guided by T-shaped rails engaging non-moving slots, may be disposed within hollow cylindrical tubes fixed within the corresponding blocks. If desired, rotation-preventing means can be provided in cases where the cylindrical rods and tubes have circular cross-section.

What is claimed is:

1. A system of interactive blocks for teaching arithmetic, comprising:
a plurality of addend blocks each having:
first and second spaced parallel exterior surfaces; and a hole extending through said block between said surfaces;
an elongated rod mounted within said hole for linear movement in a direction transverse to said surfaces;
means for limiting the movement of said rod so that when one end of said rod is adjacent said first surface the other end thereof is separated from said second surface by a predetermined distance linearly proportional to a first positive or negative numerical value, and so that said one end of said rod is movable only between said surfaces; and
a plurality of answer blocks each having:
a pair of spaced exterior surfaces and an elongated recess communicating with a selected one of said surfaces; and
means for indicating when said rod extends into said recess a distance within a predetermined range of distance values corresponding to a given numerical value.

2. The system according to claim 1, wherein said addend blocks have the shape of cylinders.

3. The system according to claim 1, further comprising a fixed rod supporting member within each of said addend blocks, said rod having a rail extending therefrom for slidably engaging a slot in said supporting member.

4. A system of interactive blocks for teaching arithmetic, comprising:
a plurality of multiplier blocks each having:
first and second spaced parallel exterior surfaces and a hole extending through said block between said surfaces;
an elongated rod mounted within said hole for linear movement in a direction transverse to said surfaces;

means for limiting the movement of said rod so that when one end of said rod is adjacent said first surface the other end thereof is separated from said second surface by a predetermined distance logarithmically proportional to a predetermined numerical value, and so that said one end of said rod is movable only between said surfaces; and a plurality of answer blocks each having:
   a pair of spaced exterior surfaces and an elongated recess communicating with a selected one of said surfaces; and
   means for indicating when said rod extends into said recess a distance within a predetermined range of distance values corresponding to a given numerical value.

5. The system according to claim 4, wherein said multiplier blocks have the shape of cylinders.

6. The system according to claim 4, further comprising a fixed rod supporting member within each of said multiplier blocks, said rod having a rail extending therefrom for slidably engaging a slot in said supporting member.

7. A system of interactive blocks for teaching arithmetic, comprising
   a plurality of minuend blocks each having an elongated rod extending from a given surface therof a first predetermined distance linearly proportional to a first numerical value;
   a plurality of subtrahend blocks each having parallel first and second spaced exterior surfaces and a hole extending through said subtrahend block between said surfaces, the width of said subtrahend block between said surfaces being linearly proportional to a second numerical value;
   a plurality of answer blocks each having:
      a pair of spaced exterior surfaces and an elongated recess communicating with a selected one of said pair of surfaces; and
      means for indicating when said rod extends into said recess a distance within a predetermined range of distance values corresponding to a given numerical value.

8. A system of interactive blocks for teaching arithmethic, comprising:
   a plurality of dividend blocks each having an elongated rod extending from a given surface thereof a first predetermined distance logarithmically proportional to a first numerical value;
   a plurality of divisor blocks each having parallel first and second spaced exterior surfaces and a hole extending through said divisor block between said surfaces, the width of said divisor block between said surfaces being logarithmically proportional to a second numerical value; and
   a plurality of answer blocks each having:
      a pair of spaced exterior surfaces and an elongated recess communicating with a selected one of said pairs of surfaces; and
      means for indicating when said rod extends into said recess a distance within a predetermined range of distance values corresponding to a given numerical value.

9. The system according to claim 1, 4, 7 or 8 wherein said rods each have one convex end and one concave end.

10. The system according to claim 1, 4, 7 or 8, wherein at least two of said blocks each has a layer of a hook material on one of the spaced exterior surfaces thereof and a layer of a pile material detachably engageable with said hook material on the other exterior surface thereof.

11. The system according to claim 10, wherein said layers have an annular configuration generally concentric with the recesses or holes in the corresponding surfaces.

12. The system according to claim 1, 4, 7 or 8, further comprising magnetic elements adjacent the spaced exterior surfaces of at least two of said blocks for retaining said blocks in detachable mutual engagement.

13. The system according to claim 1, 4, 7 or 8, wherein said answer block indicating means includes electrical sensing means adjacent said answer block recess.

14. The system according to claim 13, wherein said sensing means includes a first switch element relatively close to said answer block recess and a second switch element relatively remote from said answer block recess.

15. The system according to claim 14, wherein said first switch element has a set of normally open contacts and said second switch element has a set of normally closed contacts.

16. The system according to claim 15, further comprising a satisfactory result indicating element electrically coupled to said normally open and normally closed contacts.

17. The system according to claim 16, wherein said indicating element is a light.

18. The system according to claim 16, wherein said indicating element is a visible display of words or symbols.

19. The system according to claim 16, wherein said indicating element comprises sound generating means.

20. The system according to claim 15, wherein each of said switch elements has an additional set of contacts further comprising an unsatisfactory result indicating element electrically coupled to said additional sets of contacts, and means for rendering said element operative in response to entry of one of said rods into said answer block recess.

* * * * *

UNITED STATES PATENT OFFICE
CERTIFICATE OF CORRECTION

Patent No. 4,212,118                  Dated July 15, 1980

Inventor(s)   Blair Baldwin, et al

It is certified that error appears in the above-identified patent and that said Letters Patent are hereby corrected as shown below:

Column 1, line 25:   "eaching" should be --each--.

Column 4, line 28:   "righ" should be --right--.

Column 7, line 11:   "engaement" should be --engagement--.

Signed and Sealed this

Thirteenth Day of October 1

[SEAL]

Attest:

GERALD J. MOSSINGHOFF

Attesting Officer      Commissioner of Patents and Trademarks